No. 882,012. PATENTED MAR. 17, 1908.
J. E. MORRIS.
CONDUIT BENDING DEVICE.
APPLICATION FILED JULY 27, 1907.

Witnesses
Carl Stoughton
J. G. Campbell

Inventor
John E. Morris
By Chester C. Shepherd
Attorney

UNITED STATES PATENT OFFICE.

JOHN E. MORRIS, OF COLUMBUS, OHIO.

CONDUIT-BENDING DEVICE.

No. 882,012.  Specification of Letters Patent.  Patented March 17, 1908.

Application filed July 27, 1907. Serial No. 385,829.

*To all whom it may concern:*

Be it known that I, JOHN E. MORRIS, citizen of the United States, residing at Columbus, in the county of Franklin and State of Ohio, have invented certain new and useful Improvements in Conduit-Bending Devices, of which the following is a specification.

My invention relates to a conduit bending device particularly adapted for use in bending the conduits usually employed for the reception of electric light and telephone wires in buildings, though this device may be used for bending ordinary pipe, if desired.

In bending conduits, a bend or an offset portion of irregular shape may be required in any portion of said conduit in order to pass around or avoid studding or water pipes or any other of the numerous obstructions that are likely to come in the way in the erection of a building. In order to conveniently bend conduits under these circumstances, it is not only necessary, as has been before stated, to bend the ends of the conduits, but bends may be required near the middle portions of the conduits or at any other point between the ends. The device forming the subject matter of the present invention is particularly designed to accomplish this result.

Further objects and advantages of the invention will be set forth in the detailed description which now follows.

Figure 1:
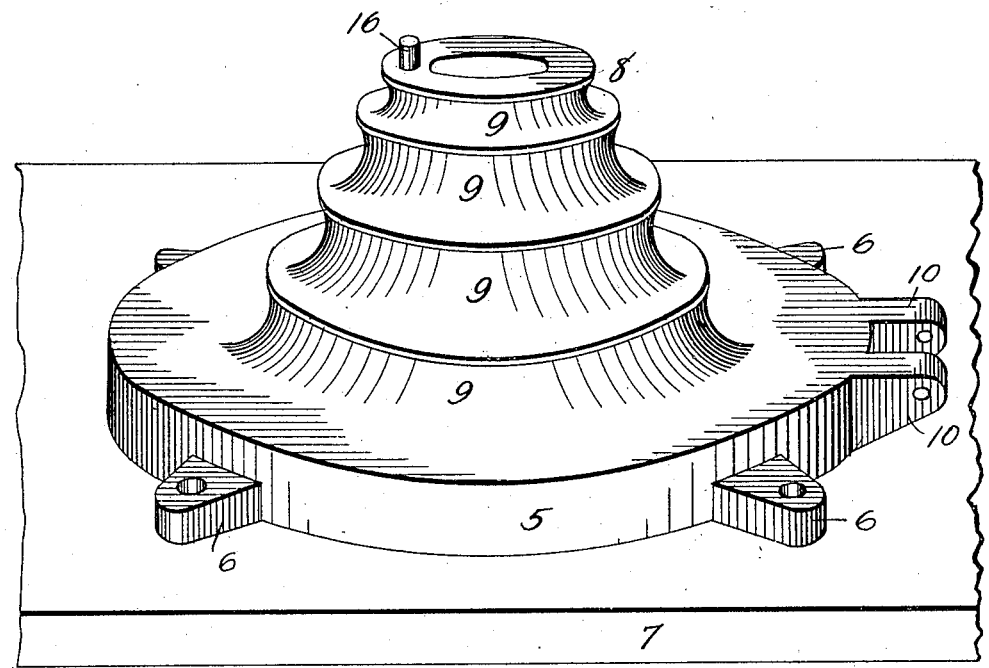
Figure 2:
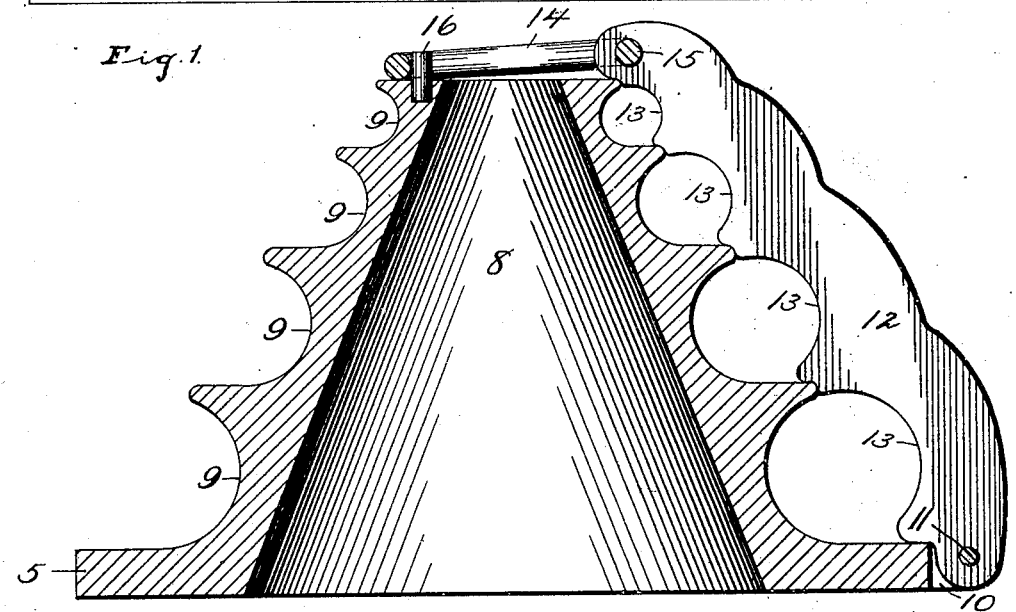

In the accompanying drawing, Figure 1 is a perspective view of a conduit bending device constructed in accordance with the invention and with certain of the parts removed, and Fig. 2 is a central vertical section therethrough.

Like numerals designate corresponding parts in both the figures of the drawing.

Referring to the drawing, the numeral 5 designates an annular base, which is provided with a plurality of perforated lugs 6 through which bolts may be passed to bolt the structure firmly upon a work-bench or table 7, the base lying in a horizontal plane, as will be readily understood. Upstanding from the base 5 is a cone-like body portion 8 which has a plurality of annular grooves 9 formed therein, said grooves being of varying radii and varying diameters to accommodate varying sizes of pipe or conduit. Pivoted between ears 10 which are cast integral with the base 5 by a pivot 11, is a swinging block or lever 12, the inner face of which is grooved as at 13 to coact with the grooves 9 of the cone-like body portion 8. A loop 14 is pivoted to the member 12 as at 15 and the free end of this loop is adapted to engage over a pin 16, said pin being carried by the body portion 8.

The operation of the device is as follows: When it is desired to bend a piece of conduit, that portion of the conduit to be bent, is placed in one of the grooves 9 which corresponds in size to the diameter of the pipe, after which the block 12 is swung over to the position illustrated in Fig. 2 and the loop 14 is forced over the pin 16 to thereby hold the block firmly into engagement with the pipe or conduit to be bent. The pipe may then be readily bent about the conical body portion 8 of the machine and since the base 5 lies in a substantially horizontal plane, the entire length or width of the room in which the machine is located, is available for freely moving the pipe to produce the desired bend.

I am aware of the fact that devices having grooved surfaces have been employed for bending pipe or conduits, but I am not aware that a device having a plurality of grooves formed in the surface thereof and which lie horizontally, has ever been employed.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

In a device of the character described, the combination with a horizontal base having a plurality of outstanding perforated lugs carried thereby, of ears projecting from said base, an upstanding body portion having a plurality of annular grooves formed in the face thereof which extend entirely around said body portion, said grooves being of varying radii and varying diameters, a swinging member grooved to co-act with the grooves of the body portion, said swinging member being pivoted to the base, a pin extending above the upper face of the body portion and a loop pivotally engaging the upper end of the swinging member, the free end of said loop being adapted to engage over said pin, those portions of the swinging member that actually lie in contact with the upstanding body portion slightly overlapping those portions of the body portion with which they contact.

In testimony whereof I affix my signature in presence of two witnesses.

JOHN E. MORRIS.

Witnesses:
FRANK G. CAMPBELL,
A. L. PHELPS.